INVENTOR.
ROBERT L. SCHALLER.
BY
*D. Emmett Thompson*
ATTORNEY.

June 24, 1969 R. L. SCHALLER 3,451,174
ENDLESS BELT ABRADING MACHINE
Filed Oct. 12, 1966 Sheet 3 of 3

INVENTOR.
ROBERT L. SCHALLER.
BY
D. Emmett Thompson
ATTORNEY.

United States Patent Office 3,451,174
Patented June 24, 1969

3,451,174
ENDLESS BELT ABRADING MACHINE
Robert L. Schaller, Camillus, N.Y., assignor to Sundstrand Corporation, a corporation of Delaware
Filed Oct. 12, 1966, Ser. No. 586,147
Int. Cl. B24b 21/00, 23/06, 25/00
U.S. Cl. 51—148          4 Claims

ABSTRACT OF THE DISCLOSURE

A belt abrading machine in which the idler pulley is journalled on a support carried by a yoke. The support is pivotally attached at one end to one leg of the yoke and there is means carried by the opposite leg of the yoke for moving the support about its pivotal mounting to effect transverse movement of the belt on the pulley. The yoke is also adjustable about its mounting axis for initial tracking of the belt, and there is means for locking the yoke in such adjusted position.

---

This invention relates to belt grinding machines of the type employing an endless abrading belt trained over a pair of pulleys, one of which is power driven, and the other an idler pulley. It is well known that due to the fact that the pulleys in the grinding machine are cylindrical, rather than being crowned, or convex, coupled with the impossibility of manufacturing, in a practical way, precision abrading belts, it is necessary in such machines to have some arrangement for initially properly tracking the belts on the pulleys. During the abrading operation, different strains are set up in different portions of the belt which causes the initially properly tracked belt to move transversely, or in a direction axially of the pulleys. When such movement of the belt starts in one direction, the belt will continue to move in that direction unless restrained, and will become mis-tracked to the extent adversely affecting the operation of the machine.

This invention has to do particularly with the tracking structure for an endless belt abrading machine, and embodies a structural arrangement whereby the spacing between the pulleys, or parts thereof, is not varied. Rather one pulley, the idler pulley, is manually adjusted about an axis extending normal to the axes of the pulleys to effect initial tracking of the belt.

The invention further includes means operable during operation of the machine to maintain the belt in proper position on the pulleys, as determined by the manual adjustment, or to limit the lateral shifting of the belt in both directions to a predetermined extent, whereby the belt may oscillate in a direction lengthwise of the axes of the pulleys, which oscillation is of predetermined extent, or magnitude, this automatic control of the belt being effected by moving the idler pulley about an axis located at one end thereof and extending normal to the axis of the driven pulley.

The invention consists in the novel features and in the combinations and constructions hereinafter set forth and claimed.

In describing this invention, reference is had to the accompanying drawings in which like characters designate corresponding parts in all the views.

Figure 1:
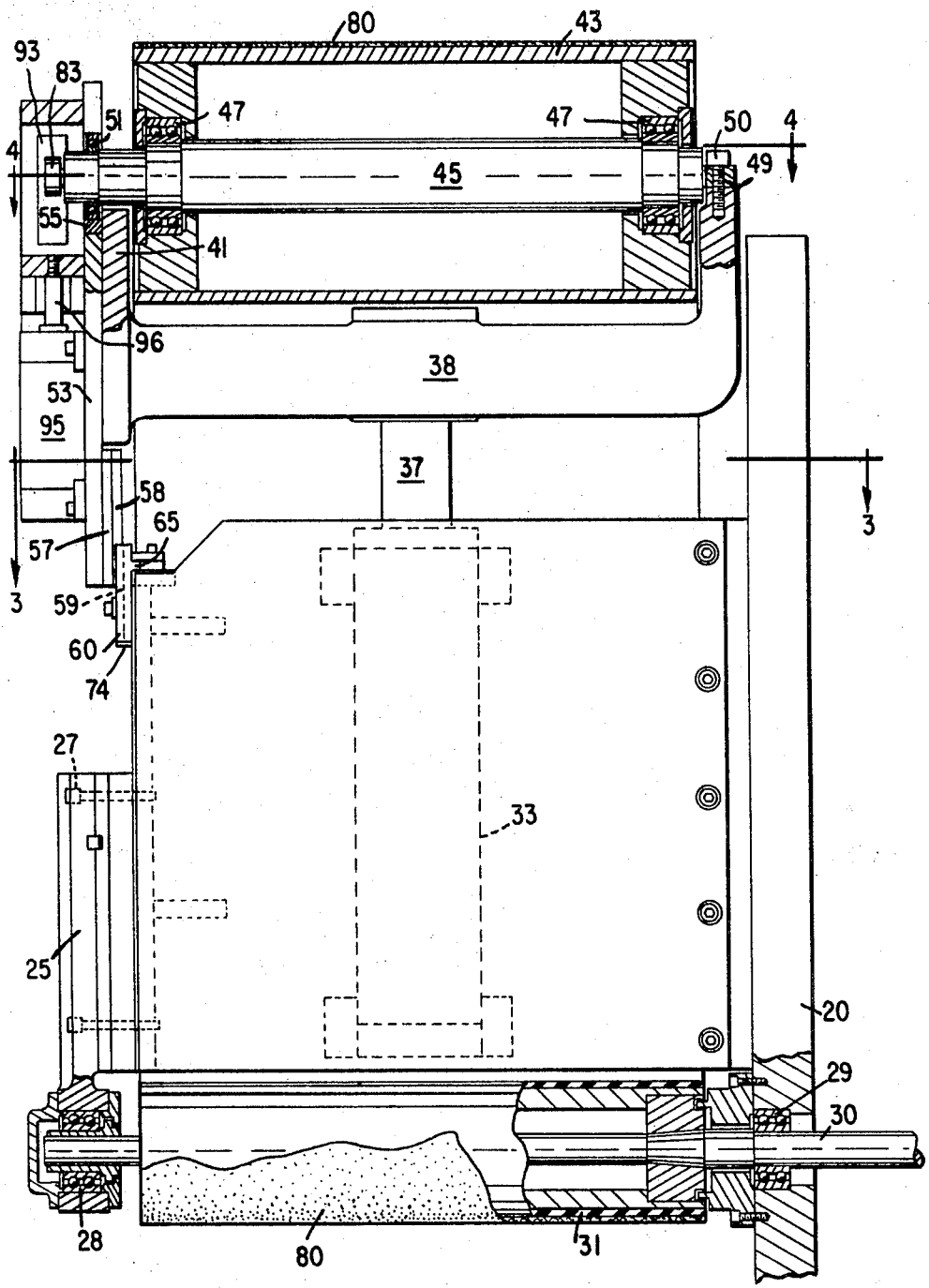
FIGURE 1 is a front elevational view of an endless belt abrading machine embodying my invention, with parts broken away and parts in section.

The abrading machine consists of a frame including a plate 20, to which is fixedly secured a boxlike structure having front and rear walls 21, 22, which, along like edges, are fixedly secured to flanges 23 fixed, or welded, to the plate 20. The opposite side of the box structure is provided with an end wall 24. A bearing bracket 25 is fixed to the end wall 24, as by screws 27, and carries an anti-friction bearing 28. A similar bearing 29 is mounted in the plate 20. A shaft 30 is journalled in the bearings 28, 29, and has affixed to it, intermediate the bearings, a driven pulley 31. The inner end of the shaft 30 is connected to a motor, or other prime mover, to effect rotation of the shaft and the driven pulley 31. The abrading operation is performed by passing work pieces underneath the pulley 31 in contact with the abrading belt 80, the work pieces being supported by a suitable platen. Abrading machines of this type are employed principally for abrading and polishing sheet material.

Figure 3:
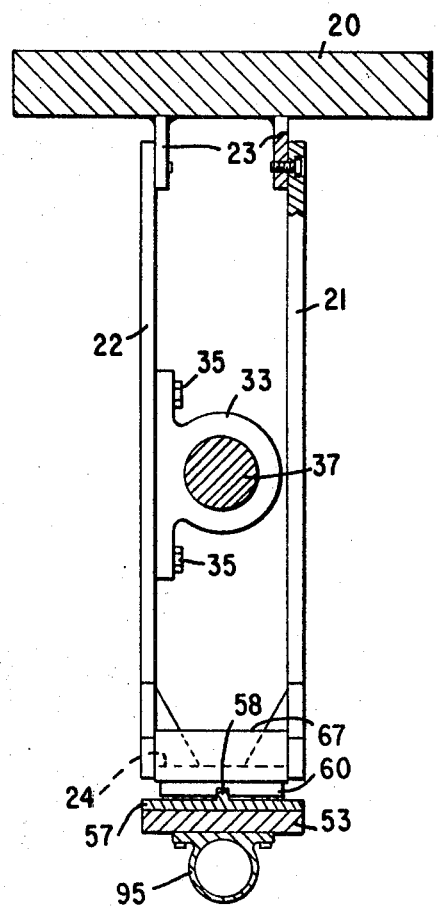
FIGURE 3 is a view taken on line 3—3, FIGURE 1.
Figure 5:
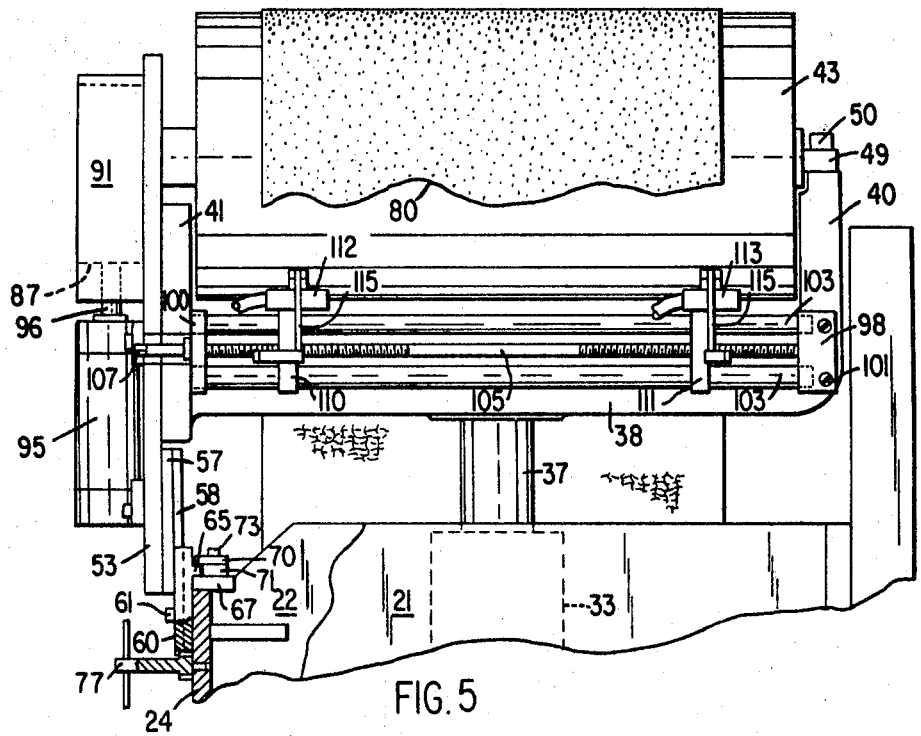
FIGURE 5 is a front elevational view of the upper portion of the machine, with parts broken away and parts in section.

A cylinder 33 is fixedly mounted within the box structure to the rear side 22, as by cap screws 35, see FIGURE 3. The piston rod 37, operating in the cylinder 33, is fixed at its upper end to a yoke member 38 having legs 40, 41, extending in a direction away from the lower driven pulley 31. An idler pulley 43 is journalled on an idler pulley support member 45 which in the form shown, see FIGURES 1 and 4, consists of a shaft on which are mounted anti-friction bearings 47 which serve to rotatably support the idler roll 43 on the support member. One end of the support member 45 is formed with a flattened portion 49 positioned on the yoke leg 40 and pivotally connected thereby by screw 50. The opposite end of the support member 45 extends above the leg 41 of the yoke, and is provided with a bearing 51 positioned in a transversely extending slot in the upper portion of a plate 53. The bottom of the slot in the plate 53, as viewed in FIGURE 1, is provided with a hardened wear strip 55. The spacing between the wear strip and the top side of the slot is such as to closely embrace the bearing 51. However, in the direction transversely of the support member 45, the slot is elongated. This, to permit pivotal movement of the support member 45 about the pivot screw 50. The plate 53 is fixedly secured to the leg 41 and projects upwardly from the leg and downwardly therefrom. A plate 57 is fixedly secured to the inner surface of the lower portion of the plate 53, and is formed with a rib 58 having sliding engagement with a slot 59 formed in a plate 60. The plate 60 is mounted on the end wall 24 by screws 61 which extend through elongated slots 63 extending transversely of the slot 59, this arrangement permitting adjustment of the plate 60 in a direction transversely of the end wall 24. The slot 59 is formed in the outer surface of the plate 60, and the rear surface is provided with a rib 65 overlying a top plate 67 on the box structure and held in sliding engagement therewith by a plate 70 mounted on a spacer 71 and fixed to the box structure by screws 73, see FIGURE 5.

The lower edge of the plate 60 is formed with gear teeth 74. The end wall 24 is provided with an aperture 75 to receive the pivot end of a gear key 77 which functions upon rotation, when the screws 61 are loosened, to effect transverse movement of the plate 60, which movement is imparted to the yoke 38 which, together with the piston rod 37, is rotatable about the axis of the piston rod.

The abrasive belt 80 is positioned on the pulleys 31, 43. Fluid is applied to the bottom of the cylinder 33 to move the yoke 38 upwardly and put the belt under tension. The machine is started up and by the key 77, the yoke and the upper pulley 43 is adjusted about the axis of the piston rod 37 to properly initially track the belt on the pulleys. Thereupon, the screws 61 are tightened to lock the yoke in the adjusted position.

During the operation of the machine, the belt 80 will shift laterally on the pulleys 31, 43. Means is provided for automatically and continuously making a slight, or fine, adjustment of the upper pulley to keep the lateral movement of the belt within closed limits.

Figure 2:
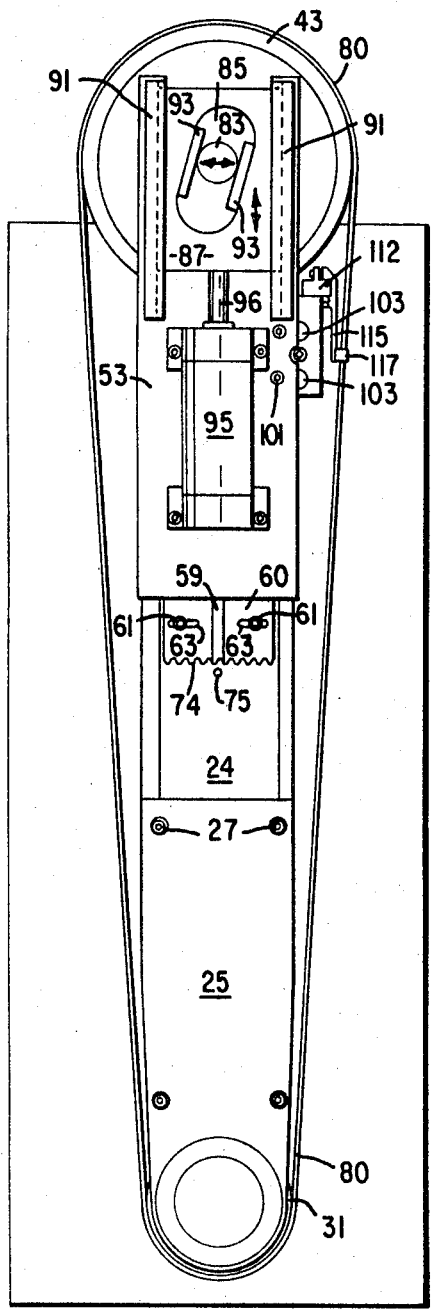
FIGURE 2 is an end elevational view, loking to the right, FIGURE 1.
Figure 4:
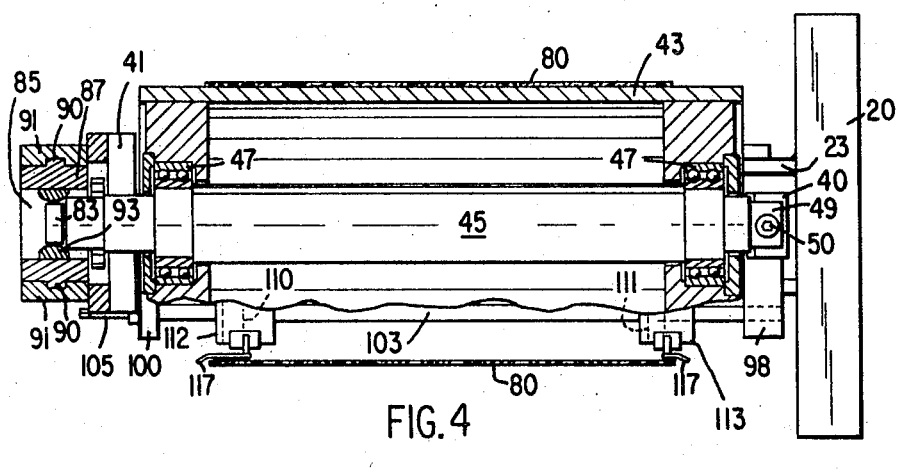
FIGURE 4 is a view taken on line 4—4, FIGURE 1, with a portion of the idler pulley broken away.

The free end of the upper pulley support member 45 is provided with a roller 83 positioned in a slot 85 formed in a plate 87, see FIGURES 2 and 4. The slot 85 is inclined relative to the axis of the piston rod 37. The plate 87 is formed on its side edges with ribs 90 slidably mounted in slots formed on the inner confronting surfaces of guide members 91, which are fixedly secured to the plate 53 and which extend in a direction parallel to the axis of the piston rod 37.

Wear strips 93 are fixed to the sides of the slot 85 and are spaced apart to closely engage the roller 83 on the free end of the support member 45. It will be apparent that as the plate 87 moves upwardly, the free end of the support member will be moved to the left, viewing FIGURE 1, and as the plate 87 is moved downwardly, the free end of the support member will be moved to the right in that figure.

A fluid cylinder 95 is fixedly mounted on the outer surface of the plate 53, and the piston rod 96 is connected to the plate 87. This arrangement being employed to move the plate 87 in the guides 91.

It will be observed that the axis of the piston rod 37 is located medial of the ends of the upper pulley 43. However, the pivotal mounting of the upper pulley support 45 is located at one end of the pulley 43. Accordingly, vertical movement of the plate 87 results in an effective tracking movement of the left end of the pulley 43, viewed in FIGURES 1, 4 and 5, but there is only a very slight, if any, movement at the opposite end of the pulley. Accordingly, this arrangement provides a fine, or vernier, tracking control for the belt.

A block 98 is fixed to the yoke leg 40, and a block 100 is fixed to the yoke leg 41. The blocks are secured to the yoke by screws 101. The blocks 98, 100, serve to support a pair of rods 103 extending in spaced apart parallel relation, see FIGURE 5, in a direction parallel to the axis of the upper pulley 43. A screw 105 is journalled in the blocks 98, 100, and extends outwardly through the block 100, and is formed with a non-circular end portion 107 for the reception of the wrench to effect rotation of the screw.

The screw 105 is formed with right and left hand threaded portions for engagement by blocks 110, 111, which are slidably mounted on the rods 103. A control device, such as a fluid valve 112 is mounted on the block 110, and a similar valve 113 is mounted on the block 111. These valves are operated by fingers 115, each provided at its free end with a wing flange 117.

The purpose of the screw 105 is to establish the spacing between the blocks 110, 111, to accommodate belts 80 of different widths, or to establish the extent of oscillation of the belt. Referring to FIGURE 4, if the belt 80 moves to the left, it will engage the wing flange 117 of the actuator for valve 112 to supply fluid to the lower end of the cylinder, effecting upward movement of the plate 87 and movement of the pulley 43 about the pivot 50.

What I claim is:

1. An endless belt abrading machine comprising a frame, a driven pulley journalled in the frame, an idler pulley yoke, yoke mounting structure carried by said frame and including means for moving said yoke toward and from said driven pulley, said yoke being rotatably adjustable in said yoke mounting structure about a mounting axis extending in a direction normal to the axis of said driven pulley, an idler pulley support extending between the legs of said yoke in parallel relation to the axis of said driven pulley, one end of said support being pivotally connected to one leg of said yoke for movement about an axis extending normal to the axis of said driven pulley and in a plane parallel to the axis of said driven pulley, an idler pulley journalled on said support intermediate the legs of said yoke and substantially in registration with said driven pulley, reversible power means carried by the opposite leg of the yoke and operable to effect movement of said idler support about said pivotal mounting in a direction transversely of the axis of said driven pulley, an abrasive belt trained over said pulleys, means yieldingly urging said yoke in a direction away from said driven pulley to maintain said belt taut, manually operable means for adjusting said yoke in said yoke mounting structure about said yoke mounting axis and securing the yoke in adjusted position, sensing members mounted in juxtaposition to the opposite side edges of said belt for engagement thereby upon lateral movement of the belt on said pulleys, belt tracking means operable upon one edge of said belt engaging one of said sensing means to actuate said reversible power means to move said idler pulley support in one direction about its pivotal mounting and, upon the opposite edge of said belt engaging said other sensing member, to actuate said power means to move said idler pulley support in the opposite direction.

2. An endless belt abrading machine as set forth in claim 1, wherein said reversible power means includes a cam member cooperable with the free end of said idler pulley support, and a fluid operated piston and cylinder structure for reversibly operating said cam member.

3. An endless belt abrading machine as set forth in claim 1, wherein said reversible power means includes a cam plate slidably mounted on said yoke for movement thereon in a direction parallel to said mounting axis, said cam plate having an inclined slot receiving the free end of said idler pulley support, and operable upon such sliding movement to effect movement of the said free end of said idler pulley support in a direction transversely of the axis thereof.

4. An endless belt abrading machine as set forth in claim 1 and including a plate fixed to said opposite yoke leg, a member carried by said frame and being adjustable in a direction about said mounting axis, said plate having slidable interlocking connection to said member for movement relative thereto in a direction parallel to said mounting axis, means operable to fixedly secure said member to said frame in adjusted position, said plate being formed with a slot extending transversely of the axis of said idler pulley support, and said support extending through said slot and being operatively connected to said reversible power means.

References Cited

UNITED STATES PATENTS

| | | | |
|---|---|---|---|
| 1,821,583 | 9/1931 | Schubert. | |
| 2,791,070 | 5/1957 | Schaller | 51—141 X |
| 3,325,947 | 6/1967 | Burt | 51—138 |
| 3,354,588 | 11/1967 | Roehrig | 51—141 |

ROBERT C. RIORDAN, *Primary Examiner.*

D. G. KELLY, *Assistant Examiner.*